United States Patent [19]
Cole

[11] Patent Number: 6,000,625
[45] Date of Patent: Dec. 14, 1999

[54] IRRIGATION METHOD

[75] Inventor: Richard Everett Cole, Oakdale, Calif.

[73] Assignee: Ciba Specialty Chemicals Water Treatments Limited, Bradford, United Kingdom

[21] Appl. No.: 09/099,218

[22] Filed: Jun. 18, 1998

Related U.S. Application Data

[60] Provisional application No. 60/050,032, Jun. 18, 1997.
[51] Int. Cl.⁶ ...................................... A62C 5/02
[52] U.S. Cl. ........................... 239/10; 239/310; 239/723; 239/727; 239/728; 47/58.1; 71/27; 504/116; 405/263
[58] Field of Search .................................. 239/1, 10, 302, 239/310, 575, 722, 723, 727, 728; 47/58.1; 71/27; 405/263; 504/116

[56] References Cited

U.S. PATENT DOCUMENTS

| | | | |
|---|---|---|---|
| 3,798,838 | 3/1974 | Hashimoto et al. | 47/58.1 |
| 4,380,600 | 4/1983 | Hosoda et al. | 524/458 |
| 4,687,505 | 8/1987 | Sylling et al. | 71/27 |
| 5,185,024 | 2/1993 | Siemer et al. | 504/116 |
| 5,580,168 | 12/1996 | Alireza et al. | 366/153.1 |
| 5,741,090 | 4/1998 | Dunning et al. | 239/10 X |
| 5,749,672 | 5/1998 | Chamberlain et al. | 405/263 X |

FOREIGN PATENT DOCUMENTS

| | | |
|---|---|---|
| 0169674 | 11/1998 | European Pat. Off. . |
| 96/02126 | 2/1996 | WIPO . |

*Primary Examiner*—Andres Kashnikow
*Assistant Examiner*—Steven J. Ganey
*Attorney, Agent, or Firm*—David R. Crichton

[57] ABSTRACT

Large crop areas are irrigated, for instance by pivot irrigation, by being sprayed with water into which a substantially stable dispersion in a liquid of water soluble polymer particles has been metered at a predetermined low rate.

IRRIGATION METHOD

CROSS REFERENCE TO RELATED APPLICATIONS

This application is an application filed under 35 U.S.C. §111(a) claiming benefit pursuant to 35 U.S.C. §119(e)(1) of the filing date of the Provisional Application 60/050,032, filed Jun. 18, 1997, pursuant to 35 U.S.C. §111(b).

FIELD OF THE INVENTION

This invention relates to the irrigation of large crop areas by spraying water onto the crop area.

BACKGROUND TO THE INVENTION

It is common practice to irrigate crop areas in those regions where there is a shortage of rainfall. One method of irrigation is by furrow irrigation. A problem with furrow irrigation is that the irrigation water flowing along the furrow is liable to erode the furrow. Also infiltration of the water through the furrow may not be as efficient as is desired. It is known to include synthetic polymer in the furrow irrigation water, the polymer often being the type which is commercially available for improving the structure of soil by direct application of the polymer to the soil. Furrow irrigation processes using such polymers are described particularly in WO96/102126.

Another way of irrigating crop areas is by spraying water onto the area. Because there is no deliberate flow of water along the surface, it might be thought that erosion would not be a problem. However erosion problems can occurs especially when the irrigated area is on a slope. Also infiltration may not be as efficient as is desirable, especially when the irrigated soil is allowed to dry out between irrigations, for instance as is likely to occur in large pivot irrigation systems where there may be a day or more between irrigations. Also not all the spray water is effective for irrigation, for instance due to run-off or evaporation.

It would be desirable to be able to minimise these deficiencies in large-scale spray irrigation.

It might be thought that introduction of polymers, for instance of the type known as soil conditioners, into the irrigation water would be beneficial. Unfortunately existing methods are not practicable.

Polymers are generally supplied initially as a powder or as a reverse phase emulsion (i.e. a dispersion of polymer particles in a non-aqueous liquid, generally oil). The normal industrial practice is to mix the powder or the reverse phase emulsion with water in special dissolution apparatus so as to form an aqueous solution of the polymer having a concentration of, for instance, 0.2 to 2% by weight and this solution is then dosed into the water which is to be treated by the polymer.

However the manufacture of this solution necessitates the provision of special make-up apparatus. It is impracticable to provide this make-up apparatus at the crop area, and if the solution is made up at a point distant from the crop area it is then necessary to transport the solution to the crop area and this is inconvenient because of the large volume of the solution.

SUMMARY OF THE INVENTION

The invention provides a method of irrigating a large crop area by pumping water through feed ducting and a mixing zone to a spray manifold supplying one or more spraying devices by which the water is sprayed onto the crop area, and in this method a substantially stable dispersion in a liquid of water soluble polymer particles is metered at a predetermined rate of 0.5 to 30 ppm into the water at or before the mixing zone and the polymer particles are substantially completely dissolved into the water before the water is sprayed from the spraying devices.

The crop area is normally at least 1,000 $m^2$ (0.1 hectare ha) but can be at least 1 ha or more and even up to 100 ha.

DESCRIPTION OF THE PREFERRED EMBODIMENTS

The invention is intended to be applied to methods in which a large crop area is irrigated by a single spray apparatus. This is important because the invention relies in part on the high rate of flow of the water to the spray apparatus, and this high rate of flow is necessarily associated with a single spray apparatus being used to spray a relatively large crop area.

The polymer dispersion can be mixed into the water supply at any convenient point as the water flows through feed ducting which leads eventually to the spray manifold. Thus the polymer can be added to the irrigation water at a point distant from the spray apparatus which is mounted in the crop area and which includes the spray manifold. However the dispersion is usually best added to the irrigation water at the spray apparatus which is mounted in the crop area. This spray apparatus typically comprises a housing, a water inlet to which feed ducting can be attached, the spray manifold and a water supply passage leading from the inlet to the spray manifold. In the invention, a mixing zone is provided in the water supply passage between the inlet and the manifold and the dispersion is preferably metered into this mixing zone or into the passage an the inlet side of the mixing zone.

The preferred type of spray apparatus is a pivot irrigation apparatus, in which one or more spraying devices extend from the spray manifold in the form of elongated arms that pivot slowly around the spraying apparatus. Typically each of these arms may have a length of, for instance, 100 to 500 meters or sometimes even more.

When the spraying device is an elongated spraying member which has a plurality of spray orifices distributed along its length (for instance as in a pivot irrigator) the spray orifices are usually relatively coarse, for instance having a diameter at least 2 or 3 mm and frequently as much as 5, 10 or even 15 mm or more. This is advantageous in the invention since it minimises the risk of blockage of the orifices by improperly dissolved polymer.

The irrigation apparatus can, instead, be a water gun, for instance where the spray apparatus has a manifold leading to a single water gun, or a plurality of water guns, that pivot about the apparatus. The high ejection pressure of water guns again minimises the risk of any blockage due to polymer.

In general, the invention is applicable to a wide variety of spraying irrigation systems including pivot irrigators, land wheels and water guns.

The area that each spraying apparatus irrigates by spraying may be as low as 500 $m^2$ but is usually at least 1000 $m^2$ (1 ha) and frequently $10^4$ to $10^6 m^2$ or even more for very large pivot irrigators. The area can be for instance at least 10 ha, preferably at least 20 ha or even at least 50 ha and in some cases at least 70 ha. It can be up to 100 ha.

The water pressure in the mixing zone is usually at least 30 psi and frequently at least 50 psi. It is generally below 100 psi. The rate of flow will depend on the area which is to be irrigated but is usually above 300 US gallons per minute and preferably above 600 US gallons per minute. This high throughput of relatively high pressure water makes it easy to generate very turbulent mixing conditions in the mixing zone so as to achieve rapid distribution of the dispersed polymer particles through the water, and rapid dissolution of the particles into water. Often there is a filter between the water inlet to the spray apparatus and the spray manifold. This filter may cause sufficient mixing, in which event the polymer should be fed into the water between the inlet and the filter, the region from the point of addition of the polymer to the spray manifold then being the mixing zone.

If the filter or other equipment which is in the apparatus anyway does not give sufficient turbulence to achieve adequate mixing, then additional baffles can be fixed within the feed passage so as to promote the turbulence and thus promote the mixing and dissolution of the polymer into water.

The polymer dispersion can be a conventional reverse phase emulsion of the relevant polymer, namely a reverse phase emulsion of aqueous polymer particles dispersed (often below 10 μm in size) in a non-aqueous liquid. Typically this emulsion contains 20 to 40% water (in the polymer particles), 20 to 40% polymer (dry weight) and 20 to 40% by weight of the non-aqueous liquid. This non-aqueous liquid can be a hydrocarbon or other hydrophobic liquid. Preferably, however, the dispersion is a reverse phase emulsion of substantially anhydrous particles of the polymer dispersed in the non-aqueous liquid. Such dispersions typically contain 35 to 65% by weight polymer and 35 to 65% by weight non-aqueous liquid and 0 to 15%, often 0 to 10%, by weight water.

Irrespective of whether the dispersion is anhydrous or aqueous, those dispersions in non-aqueous liquid preferably include an oil-in-water emulsifier in order to promote the emulsification into the irrigation water of the oil phase, so as to facilitate dissolution of the polymer particles into the water. Inclusion of such emulsifiers in reverse phase emulsions is known for promoting the dissolution of polymer when using special make-up apparatus, and any of the emulsifiers known for this purpose can be used.

Instead of using a dispersion in a non-aqueous liquid, it can be particularly preferred to use a dispersion of the polymer particles in an aqueous liquid. Since water soluble polymer particles are soluble in water, the aqueous phase of this dispersion has to contain a solubilisation inhibitor. This solubilisation inhibitor must be concentration-dependent, in order that it inhibits dissolution of the polymer particles into the aqueous phase when the aqueous phase has a high concentration of the solubilisation inhibitor, but permits dissolution of the polymer particles into water when the concentration of the solubilisation inhibitor is significantly reduced, i.e. when the dispersion is mixed into the irrigation water.

The concentration-dependent solubilisation inhibitor may consist of a single material or a mixture of materials. It is particularly preferred that part at least of the inhibitor should be a fertiliser, since this results in the irrigation water supplying both irrigation and fertilisation. The dissolution of many of the relevant polymers is inhibited by the presence of an electrolyte as part or all of the solubilisation inhibitor and so preferably an electrolyte which is a fertiliser is included in the aqueous phase of the stable dispersion. For instance the aqueous phase may include ammonium sulphate. other ammonium, phosphate and/or potassium salts can also be used as electrolyte fertiliser components.

Instead of or in addition to using inorganic electrolyte as part or all of the solubilisation inhibitor, various polymeric materials can be used. They may be nonionic or ionic. For instance the dispersion can be made by the techniques, and using the materials, described in U.S. Pat. No. 4,380,600 of Hosoda et al.

Such dispersions have a microscopic particle size, generally below 30 μm and preferably below 10 μm. It is also possible in the invention to use coarser particle sizes (at least as starting material), provided the dispersion remains sufficiently stable to be used in the invention. By this we mean that the dispersion does not settle out unacceptably (such that it cannot easily be redispersed by simple stirring), during transport and storage. Accordingly, particularly preferred compositions are compositions made by dispersing the chosen polymer particles into an aqueous solution of a polymer, optionally or preferably containing fertiliser electrolyte or other salt, for instance as described in EP-A-0169674 and of Farrar et al, assigned to Allied Colloids Limited.

The disclosure of the all the aforementioned US and European patent specifications is incorporated herein by reference.

Naturally any polymer which is utilised as part or all of the solubilisation inhibitor must be a polymer which does not interfere with the beneficial performance of the particulate polymer.

A preferred way of providing the substantially stable dispersion is by mixing, often with milling, polymer fines having a particle size generally below 200 μm into an aqueous solution of the solubilisation inhibitor.

The particulate polymer which is milled into the aqueous phase or is otherwise provided as a dispersion in a liquid phase can be any water soluble polymer which will provide beneficial results when sprayed onto the crop area. Usually it is a synthetic polymer made by polymerisation of water soluble ethylenically unsaturated monomer or monomer blend. The monomers may be selected from non-ionic, anionic and cationic monomers. Intrinsic viscosity (measured by a suspended level viscometer at 20° C. in 1 N sodium chloride buffered to pH 7) is usually at least 2 and preferably at least 4 dl/g. Often it is at least 8 or 10 dl/g, for instance up to 30 dl/g or even more in some instances.

Although the polymer can be cationic (provided it is toxicologically acceptable) the preferred polymers are usually non-ionic or anionic and thus are generally made from 0 to 70% by weight anionic monomer and 100 to 30% by weight non-ionic monomer. The non-ionic monomer is usually acrylamide but any other toxicologically acceptable ethylenically unsaturated, water soluble, non-ionic monomer can be used. The anionic monomer is usually an ethylenically unsaturated carboxylic or sulphonic monomer (often as the sodium salt) and most usually is sodium acrylate. Preferred polymers are formed by 10 to 50% by weight sodium acrylate with the balance being acrylamide.

It is important in the invention that the substantially stable dispersion should be metered at a predetermined rate into the mixing zone. Merely dribbling it into the water supply without careful control is not acceptable and, instead, accurate metering of the polymer is required so as to ensure both cost effective and approved application and the desired beneficial results of this, without incurring disadvantages due to accidental underdosing or overdosing.

Because of the high flow rate and high pressure of the water supply and the very low dosage that is required, it is necessary to use metering pump apparatus that is constructed to be suitable for achieving this very low controlled dosage into a high pressure high volume stream of water. Suitable apparatus is available from Prominent Fluids controls Inc of Pitsburgh and includes the ProMinent (trade mark) gamma G/5a associated with appropriate pressure release valve systems and other conventional means for feeding the required low amount of polymer dispersion into the water.

The amount of polymer is usually at least about 0.5 ppm (parts dry weight polymer per million parts by weight water) and usually at least 1 ppm. It is not usually necessary for it to be above about 10 or 20 ppm although in some instances it may be up to 30 or even 50 ppm, depending upon the soil conditions and the duration of irrigation and the duration of polymer application.

Sometimes the polymer is dosed into the irrigation water substantially continuously However an advantage of the invention is that the dosage can, if desired, be conducted intermittently, either in response to manual control or in response to automatic timer control. For instance, in pivot irrigation, the polymer can be dosed continuously but preferably is dosed for, for instance, one or two substantially complete rotations of the spray arms and then discontinued for, for instance, one to ten rotations before it is resumed again.

The inclusion of the proposed low dosage of the polymer in the spray water can have dramatic effects on performance. It not only eliminates capping or other surface sealing effects and increased water infiltration but also reduces run-off and erosion when the sprayed area is on an incline, and reduces loss of spray due to evaporation and drift.

The following is an example of the invention.

A potato field of a highly crustable clay was freshly tilled. In accordance with conventional practices small dams were created in the bottoms of the potato furrows to help prevent run-off of irrigation water. The field was to be irrigated using a pivot irrigator using a 150 acre circle in 18 hours using 850 gallons per minute irrigation water.

When this had been done in previous years, there had been significant crusting and water run-off.

In the invention, an anhydrous dispersion of 50% anionic polyacrylanide in 50% oil (available from Allied Colloids Inc under the trade name Soilfix) was dosed initially at 15 ppm using a low dose diaphragm pump against 60 psi water pressure.

The pump was left to run for 18 hours, i.e. for one entire circle of the pivot. Irrigation was then discontinued and then five days later irrigation was conducted for 18 hours using 5 ppm polymer addition. This was repeated 4 days later. 4 days after that there was 18 hours irrigation without polymer, 6 days later there was 18 hours irrigation with 5 ppm polymer and 5 and 10 days later there was irrigation without polymer.

It was observed that there was far less crusting and water run-off than in previous years, water infiltration was improved and there was increased crop vigour.

I claim:

1. A method of irrigating a crop area of at least 1000 $mm^2$ by pumping water through feed ducting and a mixing zone to a spray manifold supplying one or more spraying devices by which the water is sprayed onto the crop area and in which a substantially stable dispersion in a liquid of water soluble polymer particles is metered at a predetermined rate of 0.5 to 30 ppm into the water at or before the mixing zone and the polymer particles are substantially dissolved into the water before the water is sprayed from the spraying devices.

2. A method according to claim 1 in which the substantially stable dispersion is a reverse phase emulsion of aqueous particles of polymer dispersed in a non-aqueous liquid.

3. A method according to claim 1 in which the substantially stable dispersion is a reverse phase emulsion of substantially anhydrous particles of polymer dispersed in a non-aqueous liquid.

4. A method according to claim 1 in which the substantially stable dispersion is a dispersion of polymer particles in an aqueous phase containing a concentration-dependent solubilisation inhibitor.

5. A method according to claim 4 in which the solubilisation inhibitor includes an electrolyte which is a fertiliser.

6. A method according to claim 4 in which the solubilisation inhibitor includes ammonium sulphate.

7. A method according to claim 1 in which the polymer is a synthetic polymer having intrinsic viscosity at least 4 dl/g formed from water soluble ethylenically unsaturated monomer or monomer blend.

8. A method according to claim 7 in which the polymer is formed from 100 to 30% by weight acrylamide and 0 to 70% by weight ethylenically unsaturated anionic monomer.

9. A method according to claim 1 in which each spraying device comprises an elongate spray member each of which has a plurality of spray orifices distributed along its length and the spray orifices have a diameter of at least 3 mm.

10. A method according to claim 1 conducted using a spray apparatus comprising a housing, a water inlet to which water feed ducting can be attached, the spray manifold, the mixing zone, and a water supply passage leading from the inlet through the mixing zone to the manifold.

11. A method according to claim 10 in which there is a filter in the passage and the dispersion is metered into the passage on the inlet side of the filter.

12. A method according to claim 1 conducted using a pivot irrigator.

13. A method according to claim 1 in which the crop area is at least 50,000 $m^2$.

* * * * *

UNITED STATES PATENT AND TRADEMARK OFFICE
CERTIFICATE OF CORRECTION

PATENT NO. : 6,000,625
DATED : DECEMBER 14, 1999
INVENTOR(S) : RICHARD EVERETT COLE

It is certified that error appears in the above-identified patent and that said Letters Patent is hereby corrected as shown below:

Column 6, line 5 should read:

-- 1. A method of irrigating a crop area of at least 1000 $m^2$ --.

Signed and Sealed this

Fifteenth Day of August, 2000

Attest:

Q. TODD DICKINSON

Attesting Officer

Director of Patents and Trademarks